United States Patent
Benitez et al.

(10) Patent No.: US 10,690,813 B2
(45) Date of Patent: Jun. 23, 2020

(54) IMAGING OPTICS ADAPTED TO THE HUMAN EYE RESOLUTION

(71) Applicant: TESSELAND LLC, Glendale, CA (US)

(72) Inventors: Pablo Benitez, Madrid (ES); Juan Carlos Minano, Madrid (ES); Dejan Grabovickic, Madrid (ES); Jiayao Liu, Beijing (CN); Marina Buljan, Madrid (ES); Pablo Zamora, Madrid (ES)

(73) Assignee: Tesseland LLC, Madrid (ES)

(*) Notice: Subject to any disclaimer, the term of this patent is extended or adjusted under 35 U.S.C. 154(b) by 125 days.

(21) Appl. No.: 15/545,638

(22) PCT Filed: Jan. 20, 2016

(86) PCT No.: PCT/US2016/014163
§ 371 (c)(1),
(2) Date: Jul. 21, 2017

(87) PCT Pub. No.: WO2016/118648
PCT Pub. Date: Jul. 28, 2016

(65) Prior Publication Data
US 2018/0003963 A1 Jan. 4, 2018

Related U.S. Application Data

(60) Provisional application No. 62/105,905, filed on Jan. 21, 2015, provisional application No. 62/208,235, filed on Aug. 21, 2015.

(51) Int. Cl.
*G02B 27/01* (2006.01)
*G02B 3/00* (2006.01)
(Continued)

(52) U.S. Cl.
CPC ............ *G02B 3/0037* (2013.01); *G02B 27/01* (2013.01); *G02B 27/0172* (2013.01);
(Continued)

(58) Field of Classification Search
CPC .............. G02B 27/01; G02B 27/0172; G02B 27/2264; G02B 3/0037; G02B 2027/0123;
(Continued)

(56) References Cited

U.S. PATENT DOCUMENTS 4,709,152 A * 11/1987 Muller ................. G08B 13/193
250/342
5,699,194 A * 12/1997 Takahashi .......... G02B 27/0101
359/630
(Continued)

FOREIGN PATENT DOCUMENTS

| CN | 1413313 A | 4/2003 |
| CN | 101634750 A | 1/2010 |

(Continued)

OTHER PUBLICATIONS

Extended European Search Report dated Oct. 4, 2018 in corresponding EP Appl. No. 16740692.5.
(Continued)

*Primary Examiner* — William R Alexander
*Assistant Examiner* — Balram T Parbadia
(74) *Attorney, Agent, or Firm* — Faegre Drinker Biddle & Reath LLP

(57) ABSTRACT

A display device has a display, operable to generate a real image, and an optical system with one or more lenslets arranged to generate a virtual sub-image from a respective partial real image on the display, by each lenslet projecting light from the display to an eye position. The sub-images combine to form a virtual image viewable from the eye position. A radial focal length distribution of the optical
(Continued)

system decreases with increasing radial angle at radial angles greater than 20° from the frontward direction.

24 Claims, 10 Drawing Sheets

(51) Int. Cl.
| | | |
|---|---|---|
| *G02B 30/24* | (2020.01) | |
| *H04N 13/344* | (2018.01) | |
| *H04N 13/341* | (2018.01) | |
| *G06T 15/00* | (2011.01) | |
| *H04N 13/383* | (2018.01) | |
| *G02B 27/00* | (2006.01) | |
| *G06T 19/00* | (2011.01) | |

(52) U.S. Cl.
CPC .............. *G02B 30/24* (2020.01); *G06T 15/00* (2013.01); *H04N 13/341* (2018.05); *H04N 13/344* (2018.05); *G02B 27/0093* (2013.01); *G02B 2027/0123* (2013.01); *G02B 2027/0134* (2013.01); *G06T 19/006* (2013.01); *H04N 13/383* (2018.05)

(58) Field of Classification Search
CPC ........ G02B 2027/0134; G02B 27/0093; G02B 27/04; G02B 3/00; G06T 15/00; G06T 19/006; H04N 13/341; H04N 13/344; H04N 13/383; H04N 13/04
See application file for complete search history.

(56) References Cited

U.S. PATENT DOCUMENTS

| | | | |
|---|---|---|---|
| 5,726,670 A | 3/1998 | Tabata et al. | |
| 5,803,567 A | 9/1998 | Nakanishi | |
| 6,185,045 B1 | 2/2001 | Hanano | |
| 8,717,562 B2* | 5/2014 | Smart ................ | G01N 15/0211 356/336 |
| 9,143,765 B2* | 9/2015 | Kim ...................... | H04N 13/305 |
| 9,699,441 B2* | 7/2017 | Inaba ..................... | G03B 35/10 |
| 2002/0015233 A1* | 2/2002 | Park ................... | G02B 27/0172 359/630 |
| 2004/0070855 A1* | 4/2004 | Benitez .................... | G02B 3/02 359/858 |
| 2004/0108971 A1* | 6/2004 | Waldern ............. | G02B 27/0093 345/8 |
| 2004/0227703 A1 | 11/2004 | Lamvik et al. | |
| 2005/0121071 A1 | 6/2005 | Repetto et al. | |
| 2007/0024968 A1* | 2/2007 | Kim ....................... | G02B 30/27 359/463 |
| 2007/0036537 A1* | 2/2007 | You ...................... | G02B 13/003 396/333 |
| 2008/0049152 A1 | 2/2008 | Hong et al. | |
| 2008/0049153 A1 | 2/2008 | Abileah et al. | |
| 2008/0316606 A1 | 12/2008 | Inoguchi et al. | |
| 2009/0115842 A1 | 5/2009 | Saito et al. | |
| 2009/0295683 A1 | 12/2009 | Pugh et al. | |
| 2010/0149073 A1* | 6/2010 | Chaum .............. | G02B 27/0093 345/8 |
| 2011/0194163 A1* | 8/2011 | Shimizu ................... | G02B 5/32 359/15 |
| 2012/0120499 A1* | 5/2012 | Harrison ................ | G02B 17/06 359/631 |
| 2012/0123742 A1* | 5/2012 | Harrison ................ | G06F 30/00 703/1 |
| 2013/0187836 A1* | 7/2013 | Cheng ................ | G02B 27/0172 345/8 |
| 2014/0009845 A1* | 1/2014 | Cheng .................... | G03B 21/00 359/720 |
| 2015/0103225 A1* | 4/2015 | Hsu ..................... | G02B 13/0045 348/335 |
| 2016/0209657 A1* | 7/2016 | Popovich ............. | G02B 27/017 |
| 2016/0313556 A1 | 10/2016 | Futterer | |
| 2017/0055825 A1* | 3/2017 | Tumlinson ............. | A61B 3/032 |

FOREIGN PATENT DOCUMENTS

| | | |
|---|---|---|
| CN | 103841395 A | 6/2014 |
| EP | 0772077 A2 | 5/1997 |
| JP | 5-84930 U | 11/1993 |
| JP | H0638219 A | 2/1994 |
| JP | H0965245 A | 3/1997 |
| JP | H010246866 A | 9/1998 |
| JP | 2002040364 A | 2/2002 |
| JP | 2004258332 A | 9/2004 |
| JP | 2005099802 A | 4/2005 |
| JP | 2009003128 A | 1/2009 |
| JP | 2009115906 A | 5/2009 |
| JP | 2013-044896 A | 3/2013 |
| JP | 2014503836 A | 2/2014 |
| KR | 10-0454725 B1 | 1/2005 |
| KR | 10-2009-0056032 A | 6/2009 |
| WO | 2015077718 A1 | 5/2015 |

OTHER PUBLICATIONS

Cheng et al., "Large field-of-view and high resolution free-form head-mounted display", Proceedings of SPIE, vol. 7652, p. 76520D (Jul. 1, 2018).
International Search Report of PCT/US2016/014163, dated May 4, 2016 (dated May 4, 2016).
Written Opinion of the International Searching Authority of PCT/US2016/014163, dated May 4, 2016 (dated May 4, 2016).
Official Action dated Jul. 3, 2019 in corresponding Chinese Application No. 201680014253.1.
Office Action dated Oct. 29, 2019 in corresponding Japanese Application No. 2017-538425.

\* cited by examiner

IMAGING OPTICS ADAPTED TO THE HUMAN EYE RESOLUTION

CROSS REFERENCE TO RELATED APPLICATIONS

This application claims benefit of commonly assigned U.S. Provisional Patent Applications No. 62/105,905, filed on 21 Jan. 2015, and No. 62/208,235 filed on 21 Aug. 2015, both for "Immersive Compact Display Glasses." Both of those applications are incorporated herein by reference in their entirety.

FIELD OF THE INVENTION

The application relates to visual displays, and especially to head-mounted display technology.

BACKGROUND

1. References Cited

WO 2015/077718 (PCT/US 2014/067149) for "Immersive compact display glasses," referred to below as "PCT1."

US Pat. Application no. US2010/0277575 A1 by Ismael et al.

U.S. Pat. No. 5,390,047 by Mizukawa.

"Dual-lens by Sensics" http://wvvw.roadtovr.com/sensics-ceo-yuval-boger-dual-element-optics-osvr-hdk-vr-headset/and http://sensics.com/sample-quantities-of-osvr-custom-dual-asphere-optics-available-for-purchase/

F. Huang, K. Chen, G. Wetzstein. "The Light Field Stereoscope: Immersive Computer Graphics via Factored Near-Eye Light Field Displays with Focus Cues", ACM SIGGRAPH (Transactions on Graphics 33, 5), 2015. ("Huang 2015")

2. Definitions

| | |
|---|---|
| cluster | Set of opixels that illuminates the pupil range through a given lenslet. Opixels belonging to the same cluster are adjacent one to another; the clusters are topologically connected sets. The number of clusters coincides with that of lenslets. |
| display | Component that modulates the light spatially to form an image. Currently available displays are mostly electronically operated, and are "digital" displays that generate an array of distinct pixels. The display can be self-emitting, such as an OLED display, or externally illuminated by a front or a backlight system, such as an LCD, a DMD or an LCOS. The displays may be of the type called Light Field Displays (Huang 2015) implemented by stacked (transmissive) LCDs. Particularly interesting because of its thickness is the case of just 2 stacked LCDs with a separator between them. Light Field Displays support focus cues which together with the rest of the device help to solve the vergence-accommodation conflict at a reasonable cost and volume. |
| distortion | Deviation in mapping from the rectilinear projection. Distortion is said to be "pincushion" type when a square centered on the digital display appears as a shape with sides that are concave outwards when visualized through the lens, and "barrel" type when a similar square would appear as a shape with sides that are convex outwards. |
| eye pupil | Image of the interior iris edge through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of the eye rotations and with radius the average distance of the eye pupil to that center (typically 13 mm). |
| field of view | The horizontal and vertical full angles subtended by the virtual screen from the eye pupil center when the two eyes rest looking frontwards. |
| fixation point | Point of the scene that is imaged by the eye at center of the fovea. |
| fovea | The highest resolution area of the retina, which typically has a diameter of 1.5 mm. The angular radius of the cone of rays projected by the eye onto the fovea is typically 2.5°. |
| gaze vector | Unit vector of the direction linking the center of the eye pupil and the fixation point. |
| gazed region of virtual screen | Region of the virtual screen containing the fixation points for all positions of the eye pupil within the union of the pupil ranges. It contains all the ipixels that can be gazed. |
| human angular resolution | Minimum angle subtended by two point sources which are distinguishable by an average perfect-vision human eye. The angular resolution is a function of the peripheral angle and of the illumination level. If a spherical angular coordinate system is considered with the pole at the gazing vector (so the peripheral angle coincides with the polar angle), the angular resolution is not dependent on the azimuth. Moreover, the human vision resolution is almost isotropic, which means that the capacity to distinguish two point sources does not depend on the orientation of the line joining the two point sources. |
| ipixel | Virtual image of the opixels belonging to the same web. Preferably, this virtual image is formed at a certain distance from the eye (from 2 m to infinity). It can also be considered as the pixel of the virtual screen seen by the eye. When using a Light Field Display as display, the ipixels will not generally be at a fixed distance from the eye, and that distance may vary. |
| lenslet | Each one of the individual optical devices of the optics array, which collects light from the digital display and projects it to the eye sphere. The lenslet is designed to form a continuous image of opixels into ipixels. Each lenslet may |

| | |
|---|---|
| | be formed by one or more optical surfaces, either refractive or reflective. There is one lenslet per cluster. |
| opixel | Physical pixel of the digital display. There are active opixels, which are lit to contribute to the displayed image, and inactive opixels, which are never lit. When an active opixel is lit, a substantial fraction its lit rays impinge on the eye sphere inside the pupil range of its cluster's lenslets. If an inactive opixel were lit, its light rays would likely impinge on the eye sphere outside the pupil range. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. Every active opixel belongs to a single cluster and to a single web. |
| outer region of virtual screen | Region of the virtual screen formed by the ipixels which do not belong to the gazed region of virtual screen, i.e., it is formed by ipixels that can be seen only at peripheral angles greater than zero. |
| peripheral angle | Angle formed by a certain direction and the gaze vector. |
| pupil range | Region of the eye sphere illuminated by a single cluster through its corresponding lenslet. When the eye pupil intersects the pupil range of a given lenslet, then the image corresponding to its corresponding cluster is projected on the retina. For a practical immersive design, a pupil range comprising a circle of 15 degrees full angle on the eye sphere is sufficient. The union of all pupil ranges corresponding to all lenslets of the array is a spherical shell to a good approximation. The boundary of the union of all accessible eye pupil positions for an average human is approximately an ellipse with angular horizontal semi-axis of 60° and vertical semi-axis of 45° relative to the front direction. |
| rectilinear projection | Mapping between opixels and ipixels such that great circles on a spherical virtual screen are mapped on straight lines on the display. It is the classical mapping applied in photography, because straight features appear with straight lines, as opposed to being curved. A square represented on the digital display will appear as a square on a flat surface when visualized through the lens. It is also known as gnomonic map projection or pin-hole projection. |
| sub-image | An image to be shown on the virtual screen is split in several parts called sub-images. |
| virtual screen | Surface containing the ipixels, preferably being a region of the surface of a sphere concentric with the eye and with radius in the range from 2 m to infinity. When Light Field Displays are used the virtual screen is no longer a spherical static surface but the loci of the points where the rays of ipixels converge. |
| web | Set of active opixels displaying information of the same ipixel. There is a one-to-one correspondence between webs and ipixels seen through the open lenslets. The lenslet design aims to image all the opixels of each web into the ipixel corresponding to that web. The intersection of any two webs is the empty set and the union of all webs plus the inactive area is the whole digital display. This implies that every active opixel is to be imaged onto a single ipixel. |

3. State of the Art

Head Mounted Display (HMD) technology is a rapidly developing area. One aspect of head mounted display technology provides a full immersive visual environment (which can be described as virtual reality), such that the user only observes the images provided by one or more displays, while the outside environment is visually blocked. These devices have application in areas such as entertainment, gaming, military, medicine and industry.

A head mounted display consists typically in one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines a high resolution, a large field of view, a low and well-distributed weight, and a structure with small dimensions. Although some technologies successfully achieve these desired features individually, so far no known technology has been able to combine all of them. That results in an incomplete or even uncomfortable experience for the user. Problems may include a low degree of realism and eye strain (low resolution or optics imaging quality), failure to create an immersive environment (small field of view), or excessive pressure on the user's head (excessive weight).

Most present HMDs for immersive virtual reality use one positive lens per eye with rotationally symmetric surfaces to project onto the eye the light emitted by a half of one large 16:9 digital display (the other half is used for the other eye). In US2010/0277575 A1 there is a description of one such device. The basic optical function of a HMD is that of a stereoviewer, such as the one described in U.S. Pat. No. 5,390,047. Typical dimensions of the 16:9 digital display are in the 4 to 6 inch (100 to 150 mm) diagonal range, so the half display used for each eye has a rather square aspect ratio of 8:9. The optical axis of the rotationally symmetric lens is set perpendicular to the display half and passing approximately though the geometrical center of the display half. The focal length at the center of the virtual image (typically situated on the lens optical axis) ranges from 35 mm to 45 mm. The lens typically shows a gradual degradation of image quality for fields increasingly away from the on-axis field due to chromatic and geometrical aberrations. Regarding distortion, the single lens designs show typically a moderate pincushion distortion (when analyzed from the digital display to the virtual screen). This distortion also has the effect that the ipixels in the periphery on the virtual screen will appear as not square and slightly enlarged in the radial direction. The distortion conventionally makes it necessary to preprocess the image in software, to show the image on the opixels of the digital display with compensating barrel distortion so the image on the virtual screen is seen undistorted.

A prior art device called "Dual-lens by Sensics" uses two lenses per eye instead of one to correct for chromatic and geometric aberrations. That dual-lens system shows still pincushion distortion but it is claimed to be reduced relative to the single lens designs, to only 13% deviation from the rectilinear projection for a field of view of 90 degrees and a focal length on the center of the virtual screen of 35 mm. This requires then a smaller deformation of the images when preprocessed, and the ipixels in the periphery of the virtual screen will appear only 13% enlarged in the radial direction. An embodiment disclosed herein also uses two lenses that correct chromatic and geometric aberrations, but in contrast to this prior art, the pincushion distortion is very strong (and so is the required deformation in the preprocessing) in order to adapt the ipixel sizes to the human eye resolution in the peripheral vision. This makes our optical system capable of achieving focal lengths on the center of the virtual screen that are 1.5 times that in "Dual-lens by Sensics" or higher, which reduces the angular size of the ipixels on the center of the virtual screen by the same factor, greatly reducing the pixelation of the virtual screen.

Some of the embodiments herein use optics composed by several lenslet units to project the light from the digital display to the eye. PCT1 discloses concepts that are related to those embodiments, as clusters, opixels and ipixels. FIG. 1 (this is FIG. 3 of PCT1) shows a simple example with only four clusters 104t, 104b, 105t and 105b, which form the compound image created by opixels on the digital display 107. The opixels are projected by the microlens array optics to form the image of ipixels on the screen 108 (which for simplicity has been drawn here flat with a rectangular contour). Every opixel belongs to a single cluster (the intersection of any two clusters is the empty set and the union of all clusters is the whole digital display).

Each cluster displays a portion of the image on the virtual screen. Adjacent clusters display portions of the image with a certain shift. Some parts of the image appear in more than one cluster. In order to explain why this is necessary, a two-dimensional schematic drawing has been added at the top of FIG. 1. It shows the relevant rays to define the edges of the mapping between opixels and ipixels. In this drawing, the virtual screen with the ipixels is placed at infinity, so the direction of rays 100a, 101a, 102a and 103a indicates the ipixel positions on the virtual screen. The drawing is two-dimensional for simplicity, but the actual device that projects the image on the bottom left in FIG. 1 is three-dimensional and contains four lenslets, two above and two below, and not only the two shown as 104 and 105 in the schematic drawing at the top of FIG. 1. The two-dimensional scheme is used to explain the horizontal coordinates of the mapping between opixels and ipixels, and an analogous reasoning applies to the vertical coordinates.

The horizontal extent of the virtual screen extends from 100a to 103a. The portion of the image represented in the left clusters 104b is given by the edge rays 100a and 102a reaching the edges of the pupil range 106, which define the vertical lines 100a and 102a on the virtual screen 108. Analogously, the portion of the image represented in the right clusters 105t and 105b is given by the edge rays 101a and 103a, which define two vertical lines on the virtual screen 108. Therefore, the portion of the virtual screen 108 between 101a and 102a will be displayed in both left and right clusters. Specifically, lenslet 104 maps edge rays 100a and 102a of the virtual screen onto 100b and 102b on the digital display 107. Analogously, lenslet 105 maps edge rays 101a and 103a onto 101b and 103b on the digital display 107. The optical design has to guarantee that the clusters do not overlap, which is achieved with maximum use of the digital display when 101b and 102b coincide. The analogous alignment of top clusters 104t, 105t with bottom clusters 104b, 105b, is apparent from FIG. 1.

Because of the partial coincidence of the information on the clusters, ipixel ip1 is formed by the projection of four opixels, op11, op12, op13 and op14. This set of opixels is referred to as the "web" of ipixel ip1. Webs of ipixels located in the center of the virtual screen, such as ip1, contain four opixels each. However, webs of ipixels close to the boundaries of the virtual screen may have fewer opixels. For instance, the web of ipixel ip2 contains only two opixels, op21 and op22, and the web of ip3 contains only op31.

SUMMARY

One aspect of the present disclosure provides a display device comprising a display, operable to generate a real image, and an optical system, comprising one or more lenslets, arranged to generate a virtual sub-image from a respective partial real image on the display, by each lenslet projecting light from the display to an eye position. The sub-images combine to form a virtual image viewable from the eye position. A radial focal length of the optical system decreases with increasing radial angle in a region of the virtual image having a radial angle greater than 20° from the frontward direction.

Another aspect provides a display device comprising a display, operable to generate a real image, and an optical system, comprising one or more lenslets, arranged to generate a virtual sub-image from a respective partial real image on the display, by each lenslet projecting light from the display to an eye position. The sub-images combine to form a virtual image viewable from the eye position. The display device is arranged to produce partial virtual images at least one of which contains a foveal part projected by an eye onto a 1.5 mm fovea of said eye when said eye is at the eye position with its pupil within a pupil range, said foveal part of said virtual sub-image having a higher resolution than a peripheral part of said virtual image.

The optical system is arranged to produce the virtual sub-images by comprising a free-form lenslet that has a focal length varying across an active area of the free-form lenslet.

A radial focal length of the optical system may then decrease with increasing radial angle in a region of the virtual image having a radial angle greater than 20° from a frontward direction.

The radial focal length of the optical system may decrease with increasing radial angle at substantially all points of the virtual image having a radial angle greater than 20° from the frontward direction.

The sagittal focal length of the optical system may also decrease with increasing radial angle in a region of the virtual image having a radial angle greater than 20° from the frontward direction.

The sagittal focal length of the optical system may then decrease with increasing radial angle at substantially all points of the virtual image having a radial angle greater than 20° from the frontward direction.

The optical system may be arranged to produce virtual sub-images having a foveal part formed by rays meeting any part of a pupil range of an eye sphere at the eye position at a peripheral angle less than 2.5° to a radial direction of the eye sphere at the point where the respective ray meets the eye sphere, the foveal part of the sub-images having a higher resolution than a peripheral part of the sub-image.

The display device may be arranged to produce virtual sub-images at least one of which contains a foveal part projected by an eye onto a 1.5 mm fovea of said eye when said eye is at the eye position with its pupil within the pupil range, said foveal part of each said virtual sub-image having a higher resolution than a peripheral part of said virtual sub-image.

The display device may be arranged to produce from at least one said lenslet a foveal virtual sub-image projected by an eye onto a 1.5 mm fovea of a retina of said eye when said eye is at the eye position with its pupil within the pupil range, and to produce from at least one other said lenslet a peripheral virtual sub-image projected by said eye onto a portion of said retina outside said fovea, said foveal partial virtual image having a higher resolution than said peripheral partial virtual image.

The display device may be arranged to produce partial virtual images at least one of which contains a part projected by an eye onto a 1.5 mm fovea of said eye when said eye is at the eye position with its pupil within a pupil range, said part of each said virtual image having a higher resolution than a peripheral part.

The at least one lenslet may comprise a foveal lenslet arranged to produce a foveal partial virtual image projected by an eye onto a 1.5 mm fovea of a retina of the eye when the eye is at the eye position with its pupil within a pupil range, and a peripheral lenslet arranged to produce a peripheral partial virtual image projected by the eye onto a portion of the retina outside the fovea, the foveal partial virtual image having a higher resolution than the peripheral partial virtual image.

The optical system may comprise a first optical element with a first ring of optically distinct first sub-elements, and a second optical element with second and third rings of optically distinct second and third sub-elements. Alternate sub-elements in the first ring may then form respective lenslets with consecutive sub-elements in the second ring, and remaining sub-elements in the first ring may then form respective lenslets with consecutive sub-elements in the third ring.

The first and second optical elements may be opposite surfaces of a thick lens.

There is also provided a headgear comprising the display device according to any of the above aspects, with a mount for positioning the display device on a human head with the eye position of the display device coinciding with an eye of the human.

The headgear may further comprise a second display device, mounted with the eye position of the second display device coinciding with a second eye of the human.

The first display device and said second display device of the headgear may be substantially the same. For example, they may be essentially identical, or may be mirror images of each other.

The displays of the first and second display devices may be parts of a single physical display.

BRIEF DESCRIPTION OF DRAWINGS

The above and other aspects, features and advantages will be apparent from the following more particular description of certain embodiments, presented in conjunction with the following drawings. In the drawings.

Reversed rays for different ipixels have been plotted, going from a fictitious eye pupil displaced to the center of the eye towards the display.

Figure 6A:
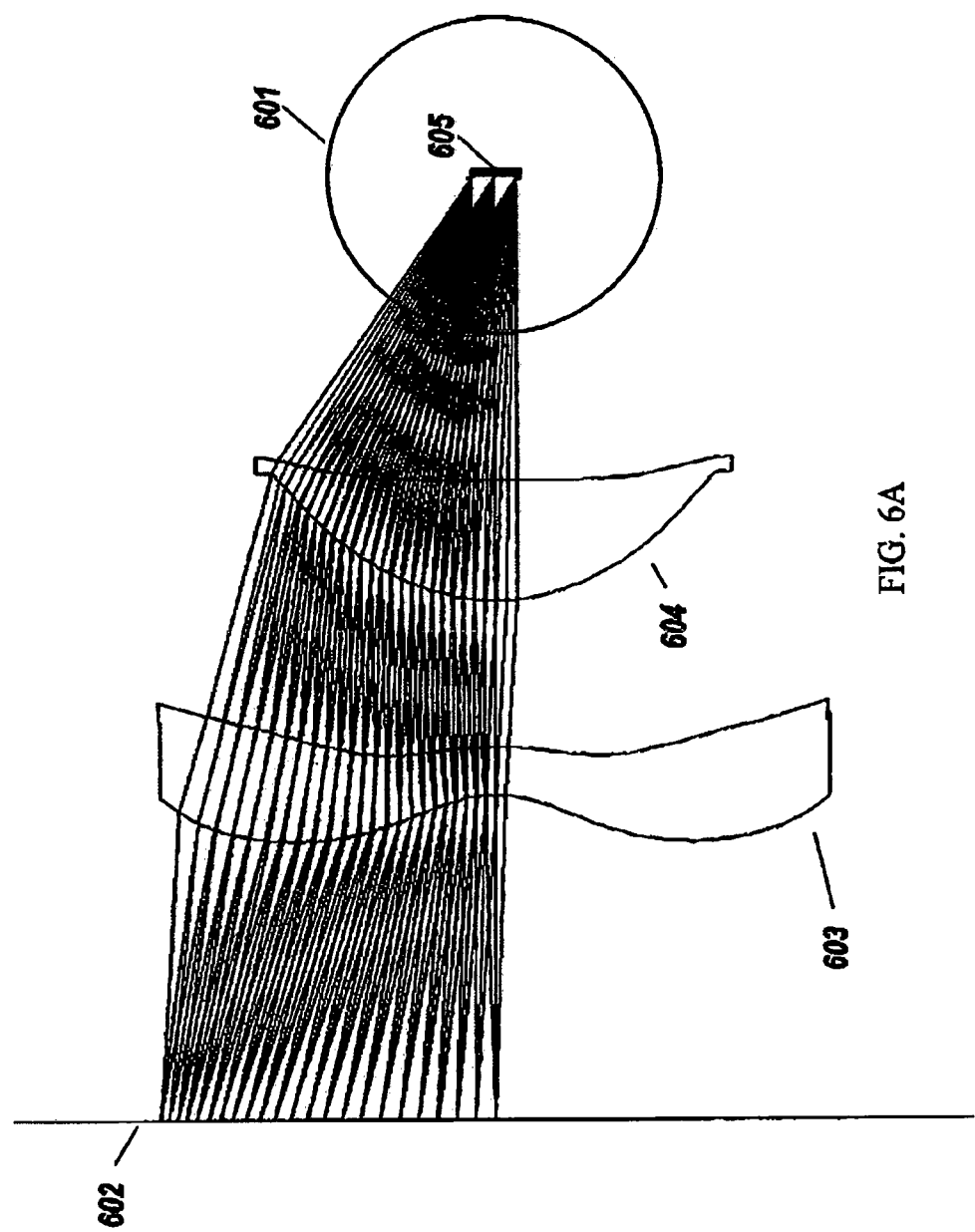
FIG. 6A is a 2D cross-section of the two-lens adapted design shown in FIG. 5.
Figure 6B:
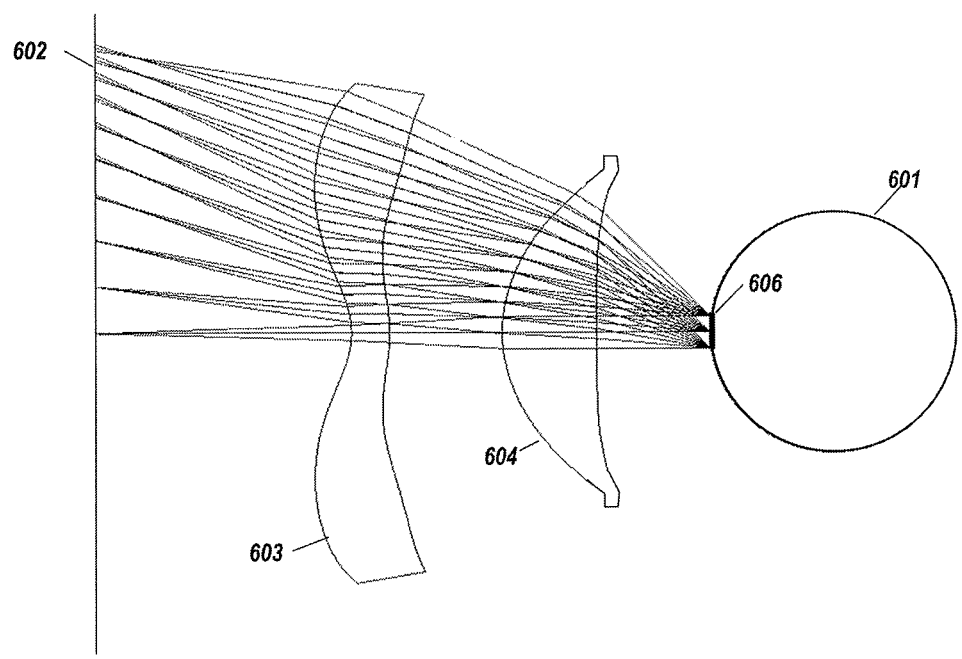

FIG. 6B is the same 2D cross-section but the rays shown correspond to those captured by the eye pupil when the eye is gazing frontwards.

Figure 7A:
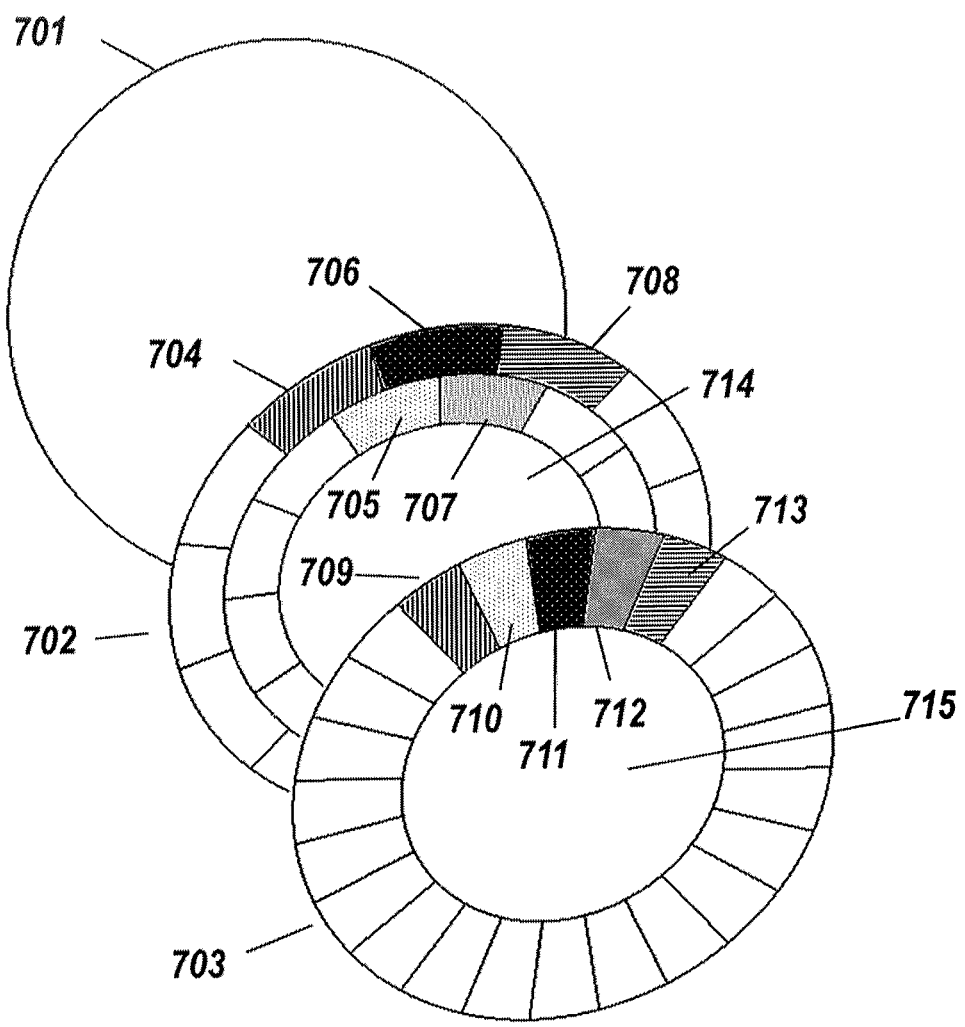

FIG. 7A is an isometric schematic view of an embodiment where we can see the eye sphere, and two optical devices that perform opixel to ipixel squeezed mapping.

Figure 7B:
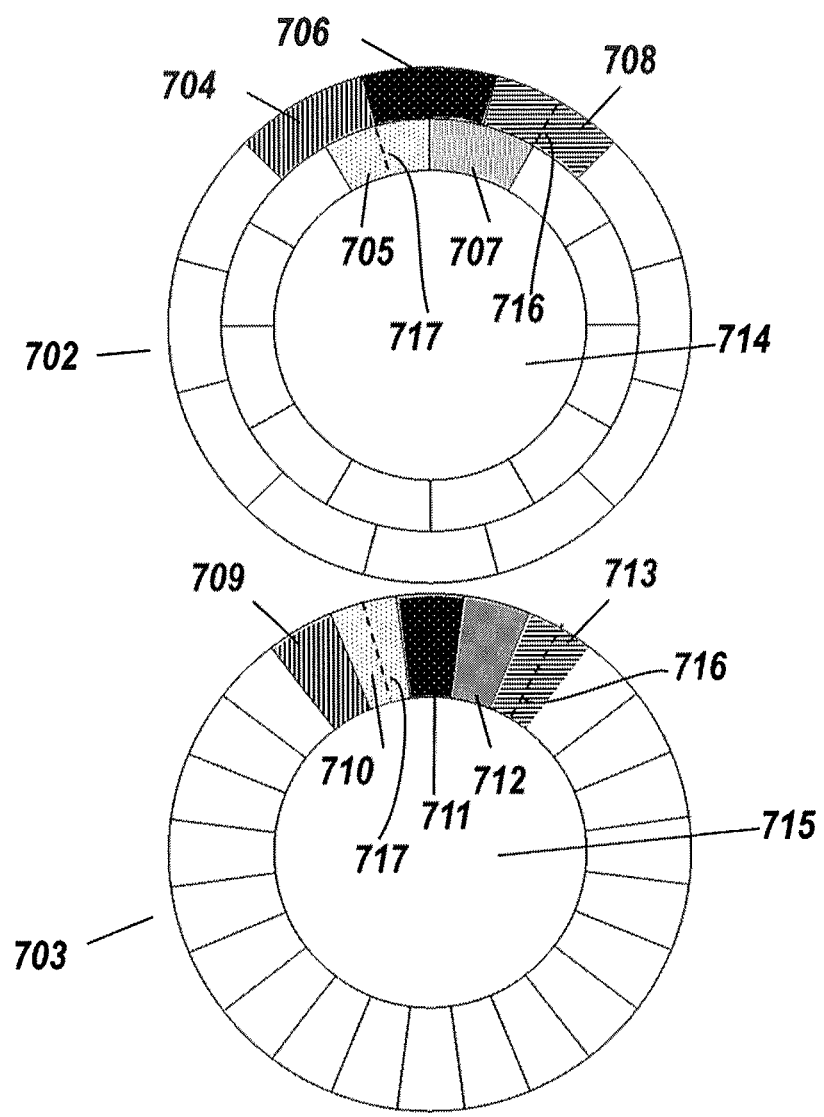

FIG. 7B is a front schematic view of the two optical devices from FIG. 7A.

Figure 8:
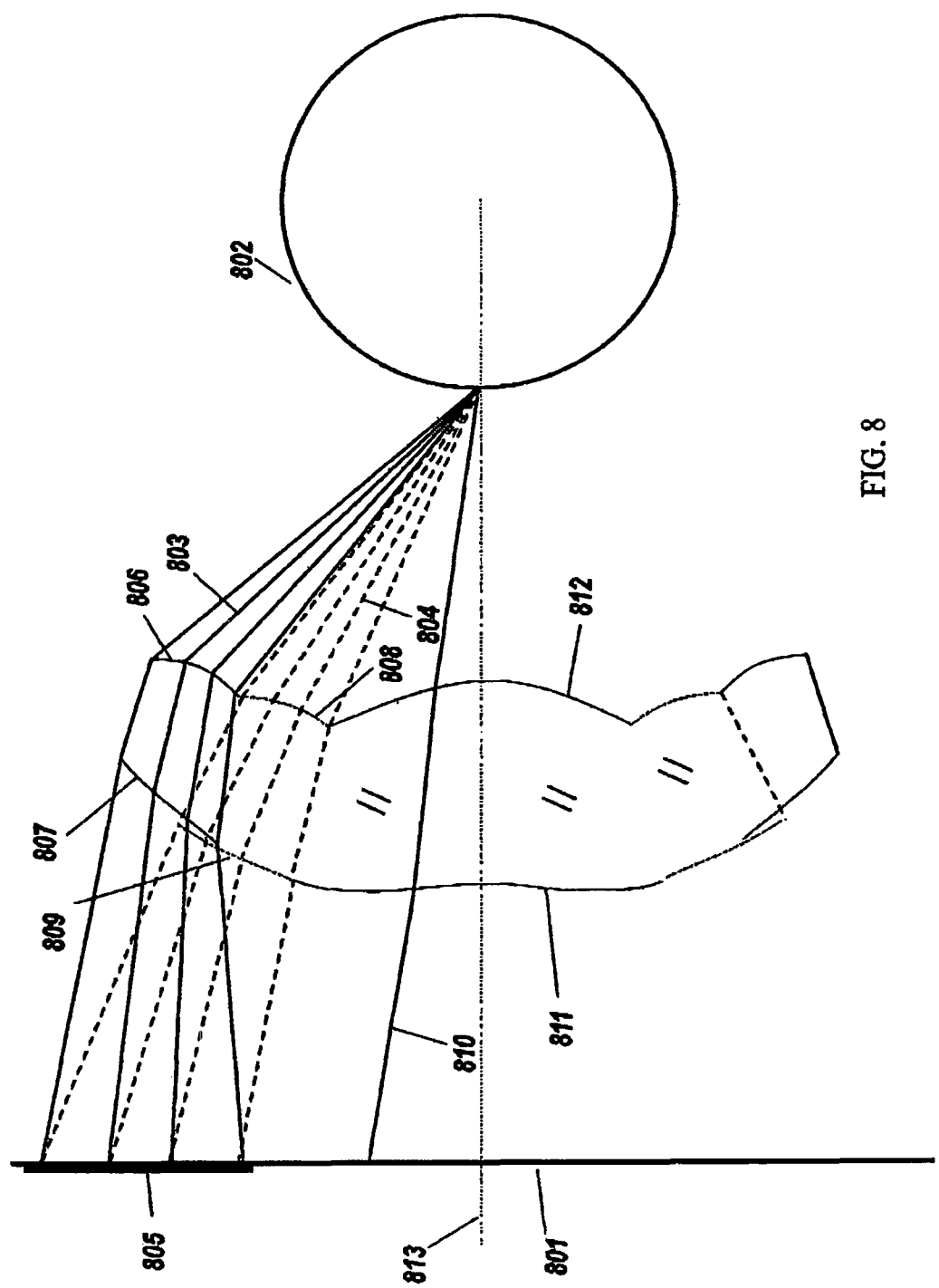

FIG. 8 is a cross-section of one possible embodiment from FIG. 7A and FIG. 7B.

Figure 9:
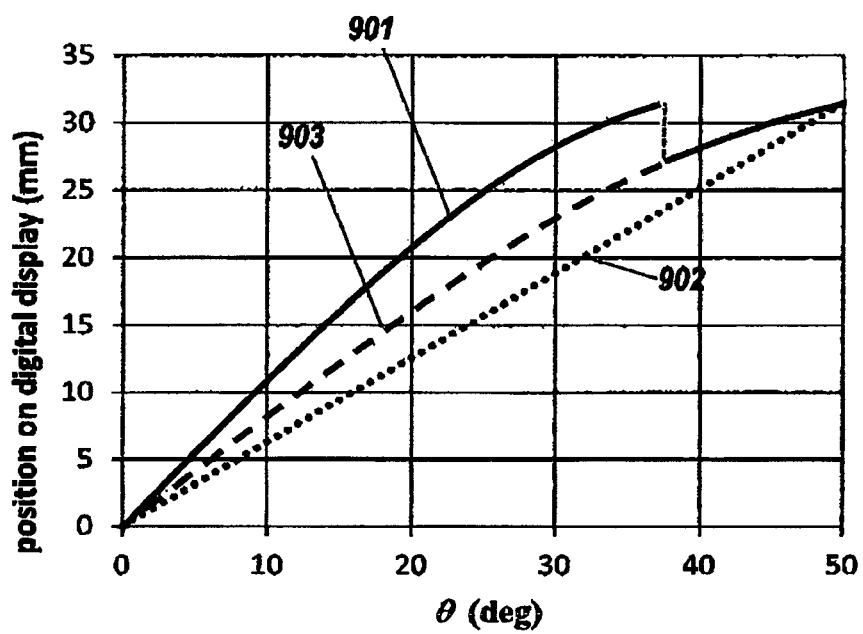

FIG. 9 is the mapping function of a linear mapping compared with the rotational and freeform adapted embodiments.

DETAILED DESCRIPTION

Figure 1:
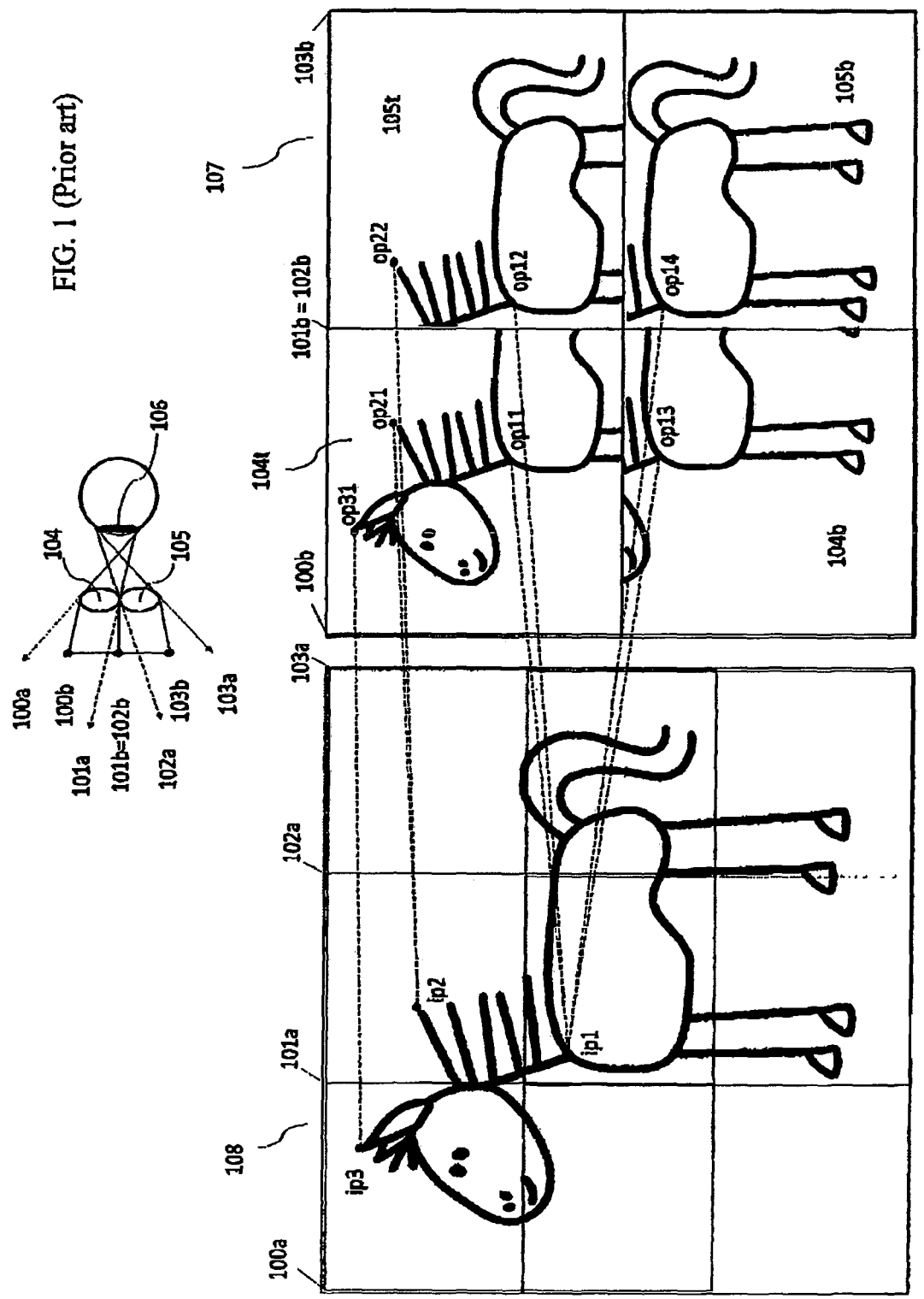
FIG. 1 is a schematic view of ipixels to opixels mapping (prior art).
Figure 2:
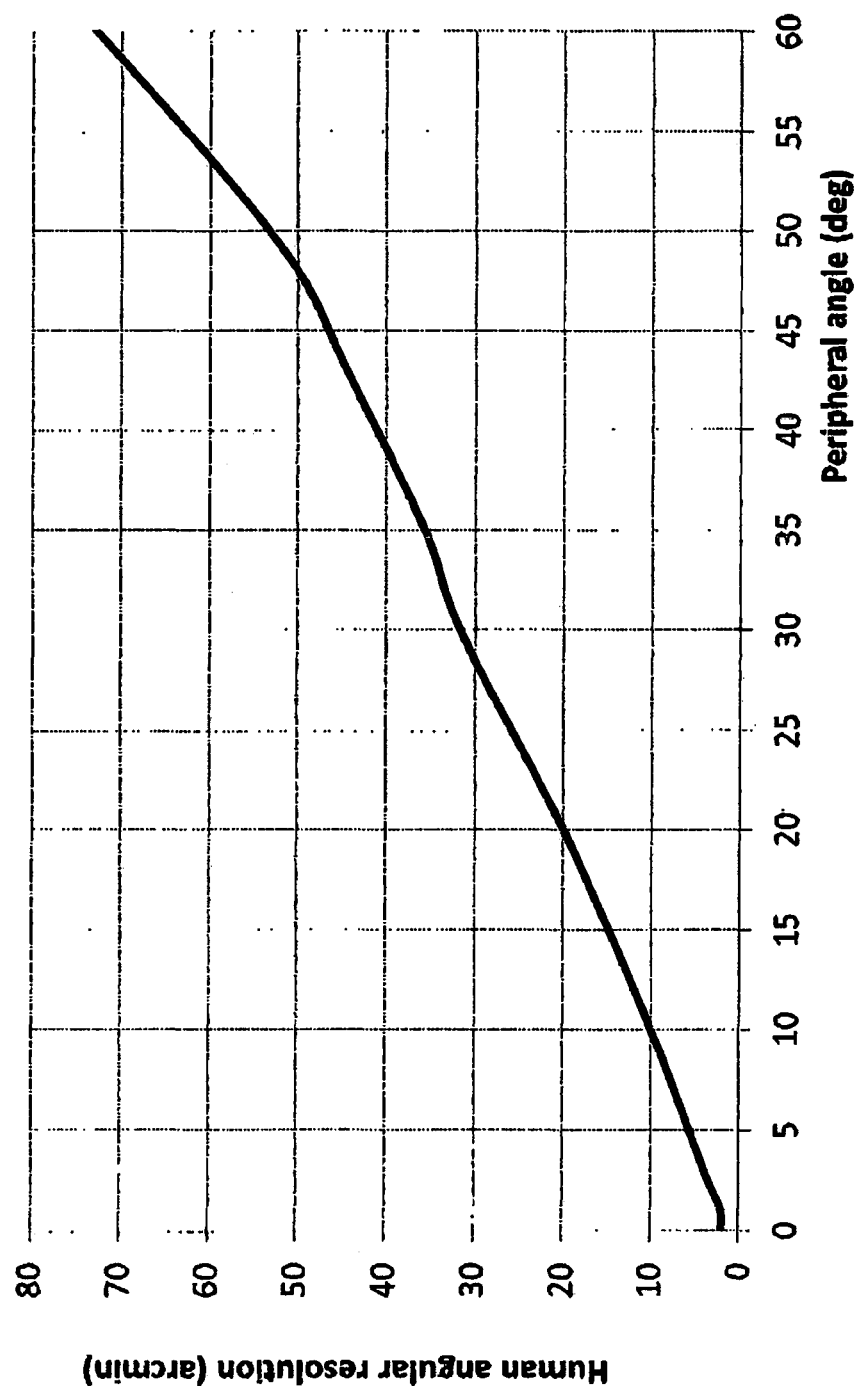
FIG. 2 shows the angular resolution of a typical human eye as a function of the peripheral angle.

Human vision resolution peaks on the part of the scene imaged at the fovea (which is about 1.5 mm in diameter) and decreases rapidly as we move away from that part. FIG. 2 shows the angular resolution of a typical human eye as a function of the peripheral angle (according to J. J. Kerr, "Visual resolution in the periphery", Perception & Psychophysics, Vol. 9 (3), 1971). If a spherical angular coordinate system is considered with the pole at the gazing vector (so the peripheral angle coincides with the polar angle), the angular resolution has no dependence on the azimuth. Moreover, the human vision resolution is approximately isotropic, which means that the capacity to distinguish two point sources does not depend on the orientation of the line joining the two point sources.

Since the human eye resolution is much coarser in peripheral vision than close to the gazing direction, we can adapt the design conditions (focal length and image quality across the virtual screen) of any of the embodiments in this specification to match the optics so the ipixels of the virtual screen are not finer than strictly needed (since the eye will not appreciate it).

By adapting the focal length across the virtual screen, which fixes the magnification from opixels to ipixels, we will make the ipixels smaller in size on the gazed region of the virtual screen and larger in the outer region of the virtual screen. This allows the ipixels in the gazed region of the virtual screen to be smaller than in a system with constant pixel size (since the total number of opixels is the same), improving therefore the resolution in that region of the virtual image without effectively degrading the rest, because the human brain will not perceive the lower resolution in the peripheral area. For an optimum design, the control of ipixels size must be done in two dimensions because the human resolution is isotropic.

By adapting the image quality across the virtual screen, we can achieve a configuration in which the ipixels are approximately equally resolved by the optics. Notice that for any given ipixel the desired image quality will depend on the position of the eye pupil within the pupil range, so the adaptation should be done for the worst case, which is for the eye pupil position in which the peripheral angle for that ipixel is at its minimum. In terms of the Modulation Transfer Function (MTF), this adaptation would imply that value of the MTF at the Nyquist frequency of the ipixels for the worst eye pupil position should ideally be approximately equal across the virtual screen. Alternatively, in terms of geometrical size of the spot, the ratio of the angular rms diameter of the spot at the virtual screen to the ipixel size for the worst eye pupil position should ideally be approximately equal across the virtual screen. If the optics is ray traced in the reverse direction (from the eye towards a point at the virtual screen, until reaching the display), this adaptation of the optical quality implies that the ratio of the rms diameter of the spot at the digital display to the opixel size for the worst eye pupil position should ideally be approximately equal across the display (even though the focal length varies).

In PCT1 (see paragraph [0309] on page 65) the idea of an optical design whose image quality is adapted to that of human vision was introduced, however the adaptation of the focal length was limited to one dimension and for the extreme peripheral angles only. Herein we further develop the adaptation to match not only the image quality but the adaptation focal length for the whole outer region of the virtual screen, in one and two dimensions.

Section 5 will describe embodiments with rotationally symmetric optics which can only control the ipixels size in the radial direction, while section 6 will describe embodiments with freeform optics (i.e., without rotational symmetry) which will control the ipixels size in their two dimensions.

4. Mapping Function and Focal Lengths

In order to make the explanation of the embodiments disclosed herein clear, formal definitions of the mapping function and focal lengths are described next. Let $(\rho, \varphi)$ be the polar coordinates of a point r on the digital display and let $\theta, \varphi$ be the polar and azimuthal angles, respectively, of the spherical coordinates on the virtual screen. $\varphi=0$ and $\varphi=\pi$ define the horizon line; the direction $\theta=0$ is called the front direction. The function $r(\theta,\varphi)=(\rho(\theta,\varphi)\cos(\varphi(\theta,\varphi)), \rho(\theta,\varphi)\sin(\varphi(\theta,\varphi))$ is called the mapping function. The inverse mapping function is given by $(\theta,\varphi)=(\theta(r),\varphi(r))$.

The radial focal length $f_{rad}$ at the virtual screen direction $(\theta, \varphi)$ is $|\partial r/\partial \theta|$, and is written as $r_\theta$. The sagittal focal length is $f_{sag}=|r_\varphi|/\sin \theta$. For other directions different than radial or sagittal, the focal length is given by $f_\alpha=|r_\theta \cos \alpha + r_\varphi \sin \alpha/\sin \theta|$ where $\alpha$ is the angle formed by the direction along which the focal distance is calculated with respect to the radial direction. The focal length informs about the expansion or shrinking of the mapping in a particular direction. When the mapping between the object and the image is conformal, then $f_\alpha$ is independent of $\alpha$ which is equivalent to saying that the mapping expansion or shrinking is isotropic. The angular extent of an ipixel along the direction $\alpha$ when the corresponding opixel is seen through the optical system on the virtual image is the physical opixel diameter over the focal length, i.e., $D_{i,\alpha}=D_o/f_\alpha$. Therefore, the ipixel size in the direction $\alpha$ is inversely proportional to the focal length $f_\alpha$ (for simplicity, circular opixels are considered herein, but it the reasoning is easily extended to the usual square opixels). Since the human eye resolution depends on the peripheral angle but it is isotropic in good approximation, it is not dependent on the direction $\alpha$ along which the resolution is evaluated. Then it is desirable that the angular extent of the ipixels be independent of $\alpha$ (otherwise the resolution will be given by the greatest angular diameter). Since the diameter of the opixels is in general quite constant with $\alpha$ then an $f_\alpha$ independent of a is in general desirable.

Assume now that we have a rotationally symmetrical optical imaging system in which the axis of symmetry is the direction $\theta=0$, and that this direction is imaged on the digital display at the point $\rho=0$. Because of the rotational symmetry, the mapping function is such that $\rho$ only depends on $\theta$, i.e. $\rho=\rho(\theta)$, and $d\varphi/d\varphi=1$. The radial focal length is $f_{rad}=|d\rho/d\theta|$ and the sagittal focal length is $f_{sag}=\rho/\sin \theta$.

The mapping of a standard optical system in imaging optics usually is a rectilinear projection, in which $\rho(\theta)=f \tan \theta$, where f is a constant which is just equal to $f_{rad}=f_{sag}$ at $\theta=0$ (the center of the virtual screen). The radial and sagittal focal lengths coincide $f_{rad}=f_{sag}=f/\cos \theta$ and are increasing functions of $\theta$. If the rectilinear mapping were used, instead of larger ipixels in the periphery it would make the ipixels progressively smaller towards the periphery of the field of view. At the edge of the gazed region of the virtual screen ($\theta=20°$), the ipixels would be a 6% smaller than at $\theta=0$, and at the edge of a 100° field of view ($\theta=50°$) the ipixels would be 35% smaller than at $\theta=0$. As explained before, this will not be useful since the eye will never gaze those edge pixels in practice.

Single lens HMDs usually deviate from the rectilinear mapping, presenting some pincushion distortion, being closer to the linear mapping $\rho(\theta)=f\theta$ (where again f is a constant which is equal to $f_{rad}=f_{sag}$ at $\theta=0$, the center of the virtual screen). For this mapping function, $f_{rad}=f$ for all $\theta$ and $f_{sag}=f \theta/\sin \theta$, which is an increasing function. Even though in this mapping the ipixels will grow less than with the rectilinear mapping, still at $\theta=45°$ they will be equal in the radial direction to, and 11% smaller in the sagittal one than, the ipixels at $\theta=0$. Therefore, still the optics is not taking advantage of the fact that the ipixels can be progressively larger from $\theta>20°$ without our vision system detecting the increase.

6. Embodiments with Rotationally Symmetric Optics

Herein we present a rotationally symmetrical optical system in which the radial focal length $f_{rad}$ is a decreasing function with an approximately constant slope with $\theta$ outside the gazed region of the virtual screen, so the ipixels at least are significantly larger in the radial direction there, showing a better adaptation of the focal length to the resolution of human eye, Moreover, the imaging quality of the optical system is also approximately adapted to the resolution of the eye.

Figure 3:
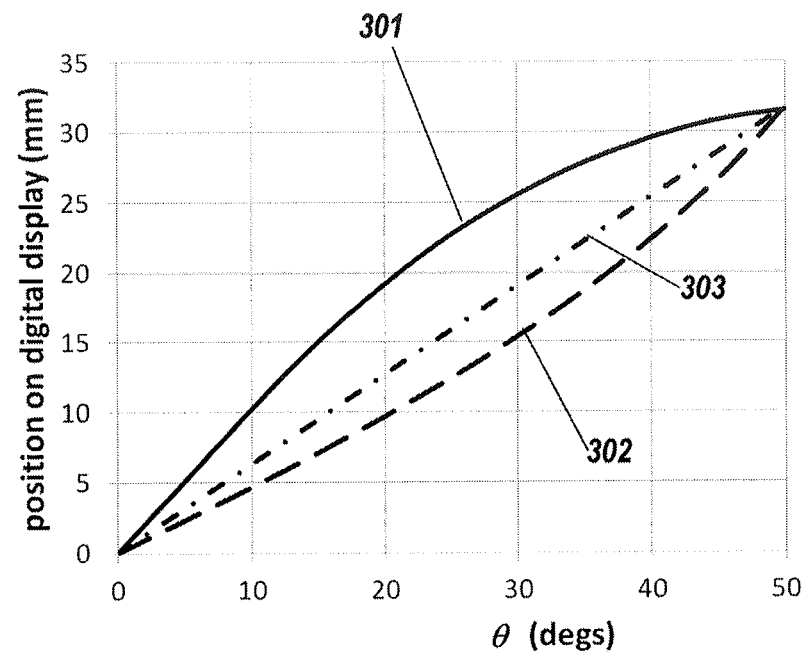
FIG. 3 is the mapping function of three different embodiments. Linear, rectilinear and adapted mapping is shown.

FIG. 3 shows a graph with the mapping function $\rho=\rho(\theta)$ of a selected adapted embodiment 301, together with the mapping functions of the rectilinear mapping 302 and the linear mapping 303. All of them have been designed to operate with the same field of view of 100° and the same 5.7",145 mm diameter, 16:9 aspect ratio digital display. One half of the display is used for each eye, so the distance from the half center of the display (where the optical axis of the lenses passes through) to the closer point of the edge is about 32 mm.

The three curves in FIG. 3 pass through the origin point ($\theta=0$, $\rho=0$) that corresponds to the center of the virtual screen (the on-axis field of the optics), and end at the point ($\theta_{end}=50°$, $\rho_{end}=32$ mm). The rectilinear mapping 302 is below the linear mapping 303 for all angles, while the curve of adapted design 301 is above the linear mapping 303. As a consequence, curve 301 starts at the origin with a derivative higher than the ratio $\rho_{end}/\theta_{end}$ but ends at the point $\rho_{end}$, $\theta_{end}$ with a smaller derivative than the ratio $\rho_{end}/\theta_{end}$, in contrast to what occurs to the linear mapping curve 303. Since these derivatives are just the radial focal length (when the abscisaa is expresses in units of radians), this indicates that 301 will have a much greater focal length (i.e., smaller ipixels) at the center of the virtual screen than 302 and 303 by making the radial focal length smaller (i.e., larger ipixels radially) at the periphery.

Figure 4:
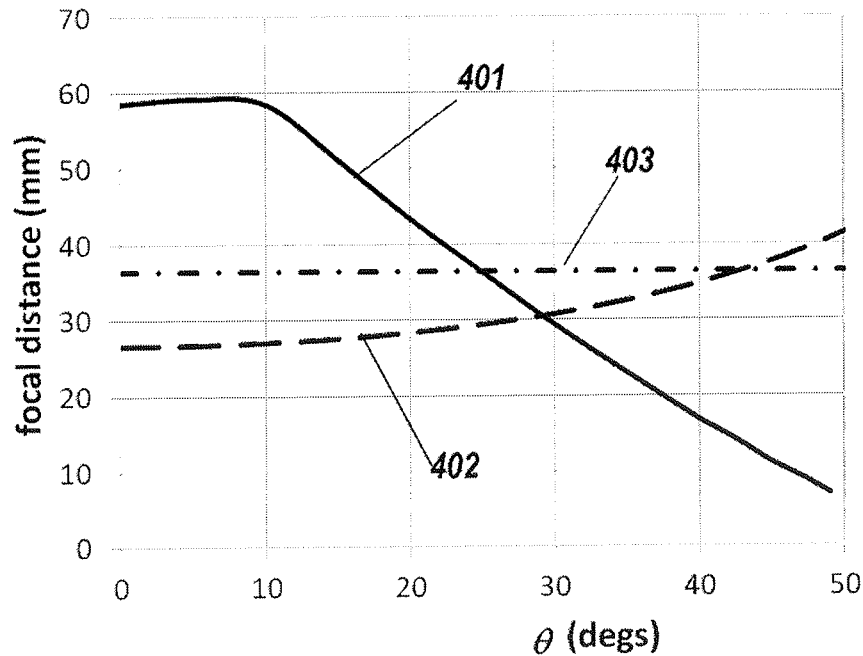
FIG. 4 is the radial focal length distribution for the same three embodiments as in FIG. 3.

FIG. 4 shows a graph with the radial focal length corresponding to the four mappings: 401 corresponding to the adapted embodiment, and 402 and 403 for the rectilinear and linear mappings, respectively. Since the curves 301, 302 and 303 in FIG. 3 share the same end points, and the curves in FIG. 4 are just the derivatives of the curves in FIG. 3, the area enclosed by any of the curves 401, 402 and 403 with the abscissa axis and lines $\theta=0$ and $\theta=50°$ is the same.

As a comparison, Table 1 and Table 2 show the values at the center of the virtual screen and at the edge, respectively, of several parameters assuming a 2560×1440 opixel display (opixel pitch=50 microns). The selected parameters are the focal lengths, angular size of the ipixels, ipixel density (in ipixels per degree) and Nyquist frequency on the virtual screen (which is the angular frequency of the on-off sequence of ipixels).

According to Table 1, at the center of the virtual screen ($\theta=0$), the ipixel size of the adapted embodiment is 3 arcmin, about 1.5 times smaller than the linear case and more than 2 times as small as in the rectilinear one. Unfortunately, for this digital display with 2560×1440 opixels, the 3 arcmin ipixels are still distinguishable (since the human eye resolves 2 arcmin as indicated in FIG. 2) but, but they are less distinguishable than with the other two mappings.

According to Table 2, at the edge of the virtual screen) ($\theta_{end}=50°$, the radial size of the ipixel in the adapted embodiment is 28 arcmin, about 6 times as large as in the linear case and 7 times as large as in the rectilinear case. Even though 28 arcmin seems a high value, when the eye gazes frontwards the peripheral angle is 50°, and resolution limit of the human vision is 50 arcmin (see FIG. 2), so the coarseness of the resolution will not be seen. However, the selected design condition is not an eye gazing frontward, but when the eye rotates to $\theta=20°$, the edge of the usually gazed region of the virtual screen. Then, the peripheral angle is 50−20=30°, and according to FIG. 2, the human vision reolution is 30 arcmin, close to the 28 arcmin of the adapted embodiment.

TABLE 1

Comparison of resulting parameters for a 5.7" (145 mm) display with 2560 × 1440 pixels at the center of the vistual screen ($\theta = 0$).

| Mapping | Focal length (mm) | ipixel diameter (arcmin) | ipixel density (ipixels/deg) | Nyquist freq. on virtual screen (cycles per deg) |
|---|---|---|---|---|
| Rectilinear | 26.6 | 6.4 | 9.4 | 4.6 |
| Linear | 36.5 | 4.7 | 12.8 | 6.4 |
| Adapted | 57.5 | 3.0 | 20.2 | 10.1 |

TABLE 2

Comparison of resulting parameters for a 5.7" (145 mm) display with 2560 × 1440 pixels at the edge of the virtual screen ($\theta_{end} = 50°$).

| Mapping | Radial focal length (mm) | ipixel radial size (arcmin) | ipixel density (ipixels/deg) | Nyquist freq. on virtual screen (cycles per deg) |
|---|---|---|---|---|
| Rectilinear | 40.8 | 4.2 | 14.4 | 7.2 |
| Linear | 36.5 | 4.7 | 12.8 | 6.4 |
| Adapted | 6.0 | 28.4 | 2.1 | 1.1 |

The sagittal focal length $f_{sag}=\rho/\sin\theta$ (not shown in FIG. 4) is not reduced as much as the radial focal length in this rotationally symmetric design. In particular, at the edge of the virtual screen $f_{sag}=\rho_{end}/\cos\theta_{end}=41$ mm, so the ipixels in the peripheral region are strongly elongated in the radial direction in this adapted design. Only breaking the rotational symmetry can take full advantage of an adapted resolution because both focal lengths can take closer values, as will be disclosed in section 7.

The adapted mapping curve 301 can be realized with a system using multiple rotationally symmetrical optical surfaces, provided that the number of aspheric surfaces is sufficient (preferably, 4 or more). When the number of surfaces is increased, the degrees of freedom are higher and the adaption can be better achieved, while designs with fewer surfaces may have more limited optical performance and thus a less pronounced slope of the mapping 301.

Figure 5:
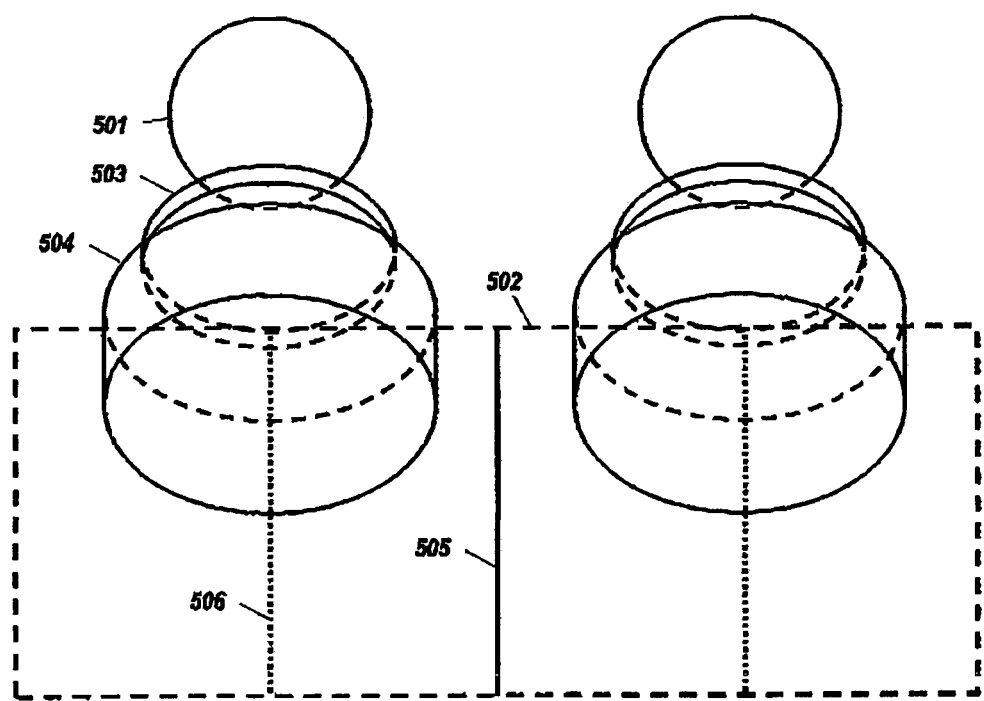
FIG. 5 is an isometric view of the 2-lens design that provides the adapted mapping and radial focal distance values given in FIG. 3 and FIG. 4.

The present specification is not restricted to a particular optical configuration, but a particular example made with two lenses will be disclosed next. FIG. 5 shows the perspective view of a 2-lens design that provides the adapted mapping and radial focal distance values given in FIG. 3 and FIG. 4. A respective lens pair, composed by refractive lenses 503 and 504, is placed between each eye 501 and the display 502. Each half of the display (divided by central line 505) works with one eye. Due to the particular dimensions of the 16:9 display used for this design (5.7",145 mm, diagonal), the center of each eye for the average standard interpupil distance is aligned with the center of the respective half of the display 506.

FIG. 6A is a 2D cross-section of the two lens adapted design, showing the profile of the eye 601, the display 602, and both lenses 603 and 604. Reversed rays for different ipixels have been plotted, going from a notional eye pupil 605 (displaced to the center of the eye to simplify the geometry) towards the display, impinging on different opixels, for different ipixels. This eye pupil 605 allows us to simulate the performance of the ipixels when they are gazed while the eye is rotated, and these gazed ipixels are therefore the ipixels whose performance should be the best. Raytrace simulation results for the case in FIG. 6A indicate the polychromatic rms spot diameter of the reversed rays impinging on the display when the eye is gazing the ipixels is in the 10-50 micron range (i.e., smaller than the 50 micron opixel pitch of the previous example) from θ=0 to θ=20°, which is the extent of the usually gazed region of the virtual screen.

FIG. 6B is the same 2D cross-section but the rays shown correspond to those captured by the eye pupil when the eye is gazing frontwards. The image quality of these rays can be progressively relaxed when the peripheral angle increases, as permitted by the decreasing human eye resolution.

As may be seen from FIGS. 6A and 6B, any ray will enter the eye only if the actual pupil (which has a typical diameter of only about 3 mm in good lighting) is at the point where the ray meets the eye sphere. If the ray is approximately radial to the eye sphere 601 at the point where the ray meets the pupil, the ray will reach the fovea. If the ray is oblique to the sphere at the point where the ray meets the pupil, of impact the ray will reach the peripheral retina. An angle of incidence of about 2.5 degrees, which corresponds to a peripheral angle also about 2.5 degrees, because the gaze direction is approximately a radius through the pupil center, may be taken as the limit of the foveal rays. See the rays meeting the "imaginary pupil" 605 in FIG. 6A. If the gaze changes, then the pupil will move, a different bundle of rays falling on the new pupil position will enter the eye, and the same considerations can be applied to the different bundle. Therefore, by ensuring that the image quality of the optical system of lenses 603, 604 is greatest for nearly radial rays, it can be ensured that the highest image definition is always projected onto the fovea, even without tracking the movement of the gaze direction and actively adapting the optics or the real image on the display 602.

As is shown in FIGS. 6A and 6B, different rays from the same opixel pass through different points of the lenses 603, 604 and fall on different parts of the pupil range of eye 601. The angle of incidence at which each ray meets the eye sphere 601 is closely dependent on the point at which the ray meets the eye sphere 601, and is also closely related to the points at which the ray meets the optical surfaces of the lenses 603, 604. By suitable design of the lenses 603, 604, therefore, the image quality for each ray bundle can be highly correlated to the angle of incidence at which the ray meets the eye sphere, and therefore the foveal rays can be singled out for sharp focus. In particular, as best seen in FIG. 6B, the most peripheral rays pass through the outer part of lens 603, which can therefore be shaped with the lowest image quality.

The profiles of the axisymmetric aspheric surfaces of the lenses can be fitted well with the following standard equation:

$$z(\rho) = a_0 + \frac{\delta\rho^2}{1+\sqrt{1-\delta^2\rho^2}} + \frac{\left(\frac{\rho}{\rho_{max}}\right)^2\left(1-\left(\frac{\rho}{\rho_{max}}\right)^2\right)}{\sqrt{1-\delta^2\rho_{max}^2\left(\frac{\rho}{\rho_{max}}\right)^2}}\sum_{i=0}^{13}g_{2i+4}Q_i^{bfs}\left(\frac{\rho}{\rho_{max}}\right)^2$$

wherein $\alpha_0$ is the vertex position along the optical axis (measured from the display), k is the conic constant, $\delta=1/R$, R the radius at the apex, $g_{2\,i+4}$ are the coefficients of Forbes Q-con polynomials $Q_i^{con}$ (Forbes, *Shape specification for axially symmetric optical surfaces*, Optics Express, Vol. 15, Issue 8, pp. 5218-5226 (2007)). For instance, the specific values of this fitting parameter for the lens in FIG. 6A, all in mm except k adimensional and $\delta$ in $mm^{-1}$, are given in the following Table 3, where the surfaces are ordered as S1 to S4 in the sequence the light rays hit them in their propagation from the display to the eye. The distance from the display to the eye pupil when the eye is gazing frontwards is 64.94 mm. The z axis of the coordinate system is pointing from the eye to the display, and the origin is at the intersection of the z axis with the display. Lens materials are polymethyl methacrylate (PMMA) for lens 604 and polystyrene (PS) for lens 603.

TABLE 3

| Lens parameter | surface S1 | surface S2 |
|---|---|---|
| $a_0$ | −26.94329977 | −30.94329977 |
| $\delta$ | −0.029652082 | −0.022656891 |
| $\rho_{max}$ | 37.86373086 | 38.34478356 |
| $g_4$ | 18.7949449 | 17.78330256 |
| $g_6$ | 9.816979341 | −2.065568151 |
| $g_8$ | 2.749842317 | −1.413982651 |
| $g_{10}$ | −0.664640159 | 3.260560002 |
| $g_{12}$ | 3.059133582 | 0.681778064 |
| $g_{14}$ | 1.956726871 | 0.892803325 |
| $g_{16}$ | −0.221411642 | 1.188163549 |
| $g_{18}$ | −0.019874566 | 0.838322267 |
| $g_{20}$ | 1.046697139 | −0.481865306 |
| $g_{22}$ | −0.102167539 | −0.318438092 |
| $g_{24}$ | −0.128467084 | 0.587034139 |
| $g_{26}$ | 0.269011327 | 0.027550858 |
| $g_{28}$ | −0.100168451 | −0.285514897 |
| $g_{30}$ | 0.040262327 | 0.051145473 |

| Lens parameter | surface S3 | surface S4 |
|---|---|---|
| $a_0$ | −42.94329977 | −52.94329977 |
| $\delta$ | −0.037274785 | 0.002196182 |
| $\rho_{max}$ | 28.53962847 | 40.4464145 |
| $g_4$ | −6.149148235 | −9.612973742 |
| $g_6$ | −3.570693728 | −1.650787422 |
| $g_8$ | −0.612654319 | 0.193024796 |
| $g_{10}$ | 1.855955461 | 0.093991101 |
| $g_{12}$ | 0.928080971 | 0.747917837 |
| $g_{14}$ | −0.815409929 | 0.761472583 |
| $g_{16}$ | −1.017599573 | 0.69362999 |
| $g_{18}$ | 0.12178509 | 0.189629988 |
| $g_{20}$ | 0.881502625 | −0.296346461 |
| $g_{22}$ | −0.056690196 | −0.774733607 |
| $g_{24}$ | −0.472230744 | −0.343565003 |
| $g_{26}$ | 0.011051573 | 0.403056135 |
| $g_{28}$ | 0.250122259 | 0.338943392 |
| $g_{30}$ | −0.102414482 | −0.17056355 |

7. Embodiments with Freeform Optics

In the previous embodiment with rotational optics, the adaptation of the magnification of ipixels is limited to the radial dimension. In this section we disclose embodiments with freeform optics that can control the ipixels size in two dimensions.

To overcome this problem we propose a new embodiment, which is based on the technique of eendue squeezing, which has been applied to nonimaging designs and largely explained in U.S. Pat. No. 8,419,232 by Juan C. Minano et al. FIG. 7A is a perspective view of the embodiment where we can see the eye sphere 701, optical devices 702 and 703, which in general could be lens surfaces, double-sided lenses or any other optical device. The display has not been plotted for the sake of clarity in the drawing, but sectors as those identified in 703 are also identified as clusters. Optical devices 702 and 703 present central regions 714 and 715 which work together, while the remaining area of both devices is divided in sectors. The sectors belonging to 703 are distributed along an external ring, while the sectors of 702 are distributed along two different external rings. The angular extent in the sagittal direction of the sectors of 702 is half of the angular extent in the sagittal direction of the sectors of 703. On the other hand, the angular extent in the tangential direction of the sectors of 702 is double the angular extent in the tangential direction of the sectors in 703. This way, the sectors tessellate conveniently and so do the clusters on the digital display.

FIG. 7B shows a front view of both optical devices 702 and 703, where 5 sectors have been highlighted in order to explain how they are arranged to work in pairs. In this way, sectors 704, 705, 706, 707 and 708 of device 702 work together with sectors 709, 710, 711, 712 and 713, respectively of device 703. While sectors 704 to 708 must tessellate to guarantee that no serious gaps are seen from the eye, microlenses 709 to 713 can show gaps (so the areas indicated as 709 to 713 in FIG. 7B are just the maximum areas the sectors can occupy).

FIG. 8 shows a cross-section of a possible realization of the embodiment in FIG. 7A, in which each of the optical devices 702 and 703 is made as a respective freeform surface of a thick lens. Therefore, sectors 704, 705, 706, 707 and 708 of surface 702 work together with sectors 709, 710, 711, 712 and 713, respectively, of surface 703, forming lenslets (704-709, 705-710, and so on). FIG. 8 shows the display 801, the eye 802 and three lenslets of this thick lens (all the other peripheral lenslets being superposable by rotation to one of the three lenslets shown).

The first, central lenslet is rotationally symmetric with respect to the central axis 813 and its cross-sectional profiles 811 and 812 correspond to the central regions 714 and 715 in FIGS. 7A and 7B. The second lenslet is a freeform lenslet that is symmetric with respect to a plane, and corresponds to the sectors 705 and 710 in FIGS. 7A and 7B. Lines 809 and 808 in FIG. 8 are the cross-sectional profiles in its plane of symmetry that contains the axis 813 in FIG. 8 and line 717 in FIG. 7B. The third lenslet is also freeform, and is symmetric with respect to another plane, and corresponds to the sectors 708 and 713 in FIGS. 7A and 7B. Lines 806 and 807 in FIG. 8 are the cross-sectional profiles in its plane of symmetry that contains the axis 813 in FIG. 8 and line 716 in FIG. 7B. Notice that the profiles of the second and third lenslets are not coplanar, and they are drawn together in FIG. 8 for this explanation only. Besides that, the ray trajectories will be reversed so light in this explanation travels from the eye to the digital display.

The reversed ray 810 travels from the eye through the central part 812, 811 of the lens and impinges on the central part of the display 801. On the other hand, reversed fans of rays 803 and 804 are transmitted through peripheral regions 806-807 and 808-809 of the lens and impinge on the external region of the display 805. Ray fan 804 (plotted with dashed lines) impinges on dashed surface 808 and then on dashed surface 809, and is directed towards the display. On the other hand, ray fan 803 (plotted with continuous lines) impinges on surface 806 and then on surface 807, and is directed towards the display. Notice that the pair of surfaces 808-809 collect reversed rays with smaller peripheral angles than the pair of surfaces 806-807.

The tessellation of clusters and lenslets as described herein allows the sagittal focal length to be reduced relative to rotational solutions, and gives room to achieve larger radial focal lengths at the center of the virtual screen. FIG. 9 illustrates this, showing the schematic curve of the mapping function 901 of this freeform embodiment along the planes of symmetry. The section θ=0-25° corresponds to the rotationally symmetric lenslet 714, 715. The part of the curve 901 from θ=25°-37.5° corresponds to the ray-fan 804 shown in FIG. 8, and reaches the edge of the digital display (at 31.75 mm for the 16:9,5.7" example). The last part of that curve 901 from θ=37.5°-50° corresponds to the ray-fan 803 shown in FIG. 8 (which is not coplanar with 804 in reality, as mentioned before), and also reaches the edge of the digital display. For comparison, the curves corresponding to the linear mapping function 902 and the rotational symmetric mapping function 903 of section 6 are also shown. A high focal length (70.5 mm in the selected example) at the center of the virtual screen (greater slope) is obtained by stretching out the ipixel size in the sagittal direction through the squeezed mapping technique, as has been explained above. The mapping squeezing allows for maintaining the same slope in the angle region θ=25°-50° as in the rotational adapted design in that angular range, and hence the same radial focal length.

As may be seen from FIG. 9, the curve 901 may be discontinuous at the boundaries between the lenslets, but if the discontinuity is well-designed the gradient of the curve may be continuous even if the curve itself is not. The step corresponding to the boundary between ray fans 804 and 803 is shown dotted in FIG. 9 to emphasize that it is, at least in the ideal case, a discontinuity, and not a segment of negative slope. Any departure from that ideal, for example, from rounding of the cusp between the lenslets, is preferably kept to a minimum, because it represents a place where light rays can scatter in undesired directions and deteriorate the quality of the image.

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

The full scope of the invention should be determined with reference to the claims, and features of any two or more of the claims may be combined.

We claim:

1. A display device comprising:
    a display, operable to generate a real image; and
    an optical system, comprising one or more lenslets, arranged to generate a virtual sub-image from a respective partial real image on the display, by each lenslet projecting light from the display to an eye position;
    wherein the rays of said projected light from each lenslet meet its corresponding pupil range of an eye sphere at said eye position, said pupil range comprising at least a circle of 15 degrees on the eye sphere, and said rays of said projected light comprise both peripheral and foveal rays, the foveal rays being those forming an angle smaller than 2.5° to a radial direction of the eye sphere at the point where the respective ray meets the eye sphere, and the peripheral rays being those that reach the peripheral retina; and
    wherein the resolution of the virtual image produced by said foveal rays is higher than that produced by said peripheral rays.

2. A display device of claim 1, wherein the optical system comprises more than one lenslet forming an array, each one of said lenslets arranged to generate a virtual sub-image from a respective partial real image on the display, by each lenslet projecting light from the display to the eye position;
wherein the sub-images combine to form the virtual image viewable from the eye position.

3. The display device of claim 2, arranged to produce virtual sub-images at least one of which contains a foveal part projected by an eye onto a 1.5 mm fovea of said eye when said eye is at the eye position with its pupil within the pupil range, said foveal part of each said virtual sub-image having a higher resolution than a peripheral part of said virtual sub-image.

4. The display device of claim 2, arranged to produce from at least one said lenslet a foveal virtual sub-image projected by an eye onto a 1.5 mm fovea of a retina of said eye when said eye is at the eye position with its pupil within the pupil range, and to produce from at least one other said lenslet a peripheral virtual sub-image projected by said eye onto a portion of said retina outside said fovea, said foveal virtual sub-image having a higher resolution than said peripheral virtual sub-image.

5. The display device of claim 2, wherein the optical system comprises a first optical element with a first ring of optically distinct first sub-elements, a second optical element with second and third rings of optically distinct second and third sub-elements, wherein alternate sub-elements in the first ring form respective lenslets with consecutive sub-elements in the second ring, and remaining sub-elements in the first ring form respective lenslets with consecutive sub-elements in the third ring;
wherein at least one optical sub-element comprises freeform optical surfaces.

6. The display device of claim 5, wherein the first and second optical elements are opposite surfaces of a thick lens.

7. A display device of claim 1, wherein a radial focal length of the optical system decreases with increasing radial angle in a region of the virtual image having a radial angle greater than 20° from a frontward direction.

8. The display device of claim 7, wherein the radial focal length of the optical system decreases with increasing radial angle at substantially all points of the virtual image having a radial angle greater than 20° from the frontward direction.

9. The display device of claim 1, wherein also the sagittal focal length of the optical system decreases with increasing radial angle in a region of the virtual image having a radial angle greater than 20° from the frontward direction.

10. The display of claim 9, wherein the sagittal focal length of the optical system decreases with increasing radial angle at substantially all points of the virtual image having a radial angle greater than 20° from the frontward direction.

11. A headgear comprising the display device of claim 1, with a mount for positioning the display device on a human head with the eye position of the display device coinciding with an eye of the human.

12. The headgear of claim 11, further comprising a second display device, mounted with the eye position of the second display device coinciding with a second eye of the human.

13. The headgear of claim 12, wherein said display device and said second display device are substantially the same.

14. The headgear of claim 12, wherein said display of said display device and said display of said second display device are parts of a single display.

15. A display device comprising:
a display, operable to generate a real image; and
an optical system, comprising one or more lenslets, arranged to generate a virtual sub-image from a respective partial real image on the display, by each lenslet projecting light from the display to an eye position;
wherein the sub-images combine to form a virtual image viewable from the eye position;
wherein each lenslet is configured such that rays of said projected light meet its corresponding pupil range of an eye sphere at said eye position, said pupil range comprising at least a circle of 15 degrees on the eye sphere;
wherein at least one lenslet is configured such that the rays are projected by the eye onto the retina forming an image whose resolution is higher on a 1.5 mm fovea than on a part of the peripheral retina.

16. The display device of claim 15, wherein the optical system is arranged to produce said virtual sub-images by comprising a free-form lenslet that has a focal length varying across an active area of said free-form lenslet.

17. The display device of claim 15, wherein a radial focal length of the optical system decreases with increasing radial angle in a region of the virtual image having a radial angle greater than 20° from a frontward direction.

18. The display device of claim 17, wherein the radial focal length of the optical system decreases with increasing radial angle at substantially all points of the virtual image having a radial angle greater than 20° from the frontward direction.

19. The display device of claim 15, wherein a sagittal focal length of the optical system decreases with increasing radial angle in a region of the virtual image having a radial angle greater than 20° from a frontward direction.

20. The display device of claim 19, wherein the sagittal focal length of the optical system decreases with increasing radial angle at substantially all points of the virtual image having a radial angle greater than 20° from the frontward direction.

21. A headgear comprising the display device of claim 15, with a mount for positioning the display device on a human head with the eye position of the display device coinciding with an eye of the human.

22. The headgear of claim 21, further comprising a second display device, mounted with the eye position of the second display device coinciding with a second eye of the human.

23. The headgear of claim 22, wherein said display device and said second display device are substantially the same.

24. The headgear of claim 22, wherein said display of said display device and said display of said second display device are parts of a single display.

* * * * *